United States Patent [19]

Bellavia, Jr.

[11] Patent Number: 4,837,820
[45] Date of Patent: Jun. 6, 1989

[54] HYBRID CATV SCRAMBLING SYSTEM

[75] Inventor: Andrew S. Bellavia, Jr., Elk Grove Village, Ill.

[73] Assignee: Zenith Electronics Corporation, Glenview, Ill.

[21] Appl. No.: 920,488

[22] Filed: Oct. 17, 1986

[51] Int. Cl.$^4$ ............... H04N 7/167; H04N 7/10; H04K 3/00
[52] U.S. Cl. ................................ 380/7; 358/86; 380/20; 455/1; 455/4
[58] Field of Search ............ 358/86; 455/4–6, 455/1; 380/7, 10, 20

[56] References Cited

U.S. PATENT DOCUMENTS

| | | | |
|---|---|---|---|
| Re. 29,997 | 5/1979 | der Toonder | 380/7 |
| 3,736,369 | 5/1973 | Vogelman | 380/7 |
| 3,914,534 | 10/1975 | Forbes | 380/13 |
| 4,367,557 | 1/1983 | Stern et al. | 455/4 |
| 4,434,436 | 2/1984 | Kleykamp et al. | 380/7 |
| 4,577,224 | 3/1986 | Ost | 380/20 |
| 4,642,688 | 2/1987 | Lowry | 380/20 |
| 4,673,976 | 6/1987 | Wreford-Howard | 380/10 |
| 4,688,248 | 8/1987 | Tomizawa | 380/20 |

Primary Examiner—Stephen C. Buczinski
Assistant Examiner—Linda J. Wallace

[57] ABSTRACT

A CATV scrambling system ultilizes low cost, uncritical, pole mounted components for all subscriber locations and high cost precision components only in subscriber units provided at "premium" subscriber locations. The subscriber unit includes a digital stepped oscillator for generating frequencies that are 1/10 of the frequency of the premium television signals and are supplied, along with data, to a pole unit scrambling station. The pole unit has a microprocessor which interprets the data and opens a switch for premium television signals that are to be received. The digital stepped oscillator output is supplied to a frequency multiplier which produces interfering carrier frequency signals that are injected through a directional coupler into the cable that feeds the subscriber TV/VCR. A broad band default oscillator is activated by a microprocessor in the pole unit when there is no subscriber unit or when the data is not present.

7 Claims, 1 Drawing Sheet

HYBRID CATV SCRAMBLING SYSTEM

BACKGROUND OF THE INVENTION

This invention relates generally to CATV scrambling systems and specifically to CATV scrambling systems that incorporate pole moounted scrambling units.

A CATV system includes a cable station, commonly referred to as a head end, that supplies a plurality of television (TV) signals or "channels" over a network of cables to a group of subscriber locations for a fee. Most cable systems offer subscribers different levels of programs or service. For example, there s usually a basic television service and, for an extra fee, the subscriber may receive a movie channel, a sport channel or other special programming events.

A difficulty exists in most cable systems that use "in-home" converter/decoders, due to their incompatibility with video cassette recorders (VCR's) and full featured television receivers. This is because the output of the converter/decoder is restricted to VHF channel 3 or VHF channel 4 and essentially nullifies the multi-channel tuners in the VCR and TV. So-called "on the pole" systems circumvent this difficulty by passing all of the authorized television channels to the subscriber so that his VCR and television receiver are fully funtional. Pole systems are generally categorized as negative or positive. Negative systems individually trap out the premium channels from the channels passed to the subscriber. This requires an expensive trap for every premium channel and the traps themselves are quite temperature sensitive. In short, it is difficult and expensive to built reliable traps for the temperature range in an outdoor environment. Positive systems, on the other hand, insert an interfering signal on each premium channel, which is turned off for an authorized channel. Here again, the oscillators required to generate the interfering signals are sensitive to temperature variation and relatively expensive to manufacture. In such systems, a change in service level may require accessing equipment on the pole to add or change a trap, unless expensive automoatic equipment is used. Also, power for the pole systems is supplied by the cable head end which imposes a significant operating cost burden on the cable operator.

The system of the present invention is a "hybrid" and involves a pole mounted scrambling unit and a subscriber location unit. Critical components are used in the subscriber unit that operates in a relatively benign environment, whereas the low power consumption pole unit uses low cost temperature insensitive components. While each subscriber location is equipped with a pole unit, only subscriber locations for which premium channels are authorized are equipped with a subscriber unit. Indeed, the subscriber unit need not be accessible to the subscriber since it is controlled from the head end. A subscriber unit, when present, also supplies operating power for the pole unit.

OBJECTS OF THE INVENTION

A principal of the invention is to provide a novel CATV scrambling system.

Another object of the invention is to provide a low cost, temperature stable scrambling system for a CATV systm.

Another object of the invention is to provide a CATV scrambling system involving a minimum of installed equipment cost for the cable operator.

BRIEF DESCRIPTION OF THE DRAWINGS

Further objects and advantages of the invention will be apparent upon reading the following description in conjunction with the drawing in which.

DESCRIPTION OF THE PREFERRED EMBODIMENT

Figure 1:
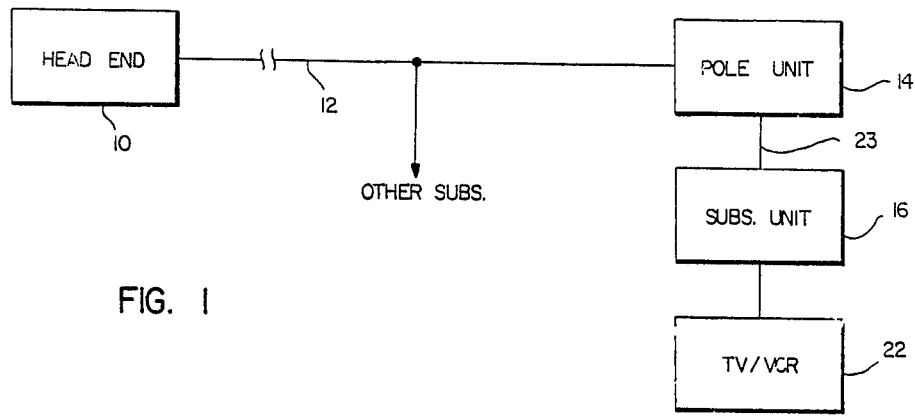
FIG. 1 represents a simplified block diagram of a CATV system constructed in accordance with the invention.
Figure 2:
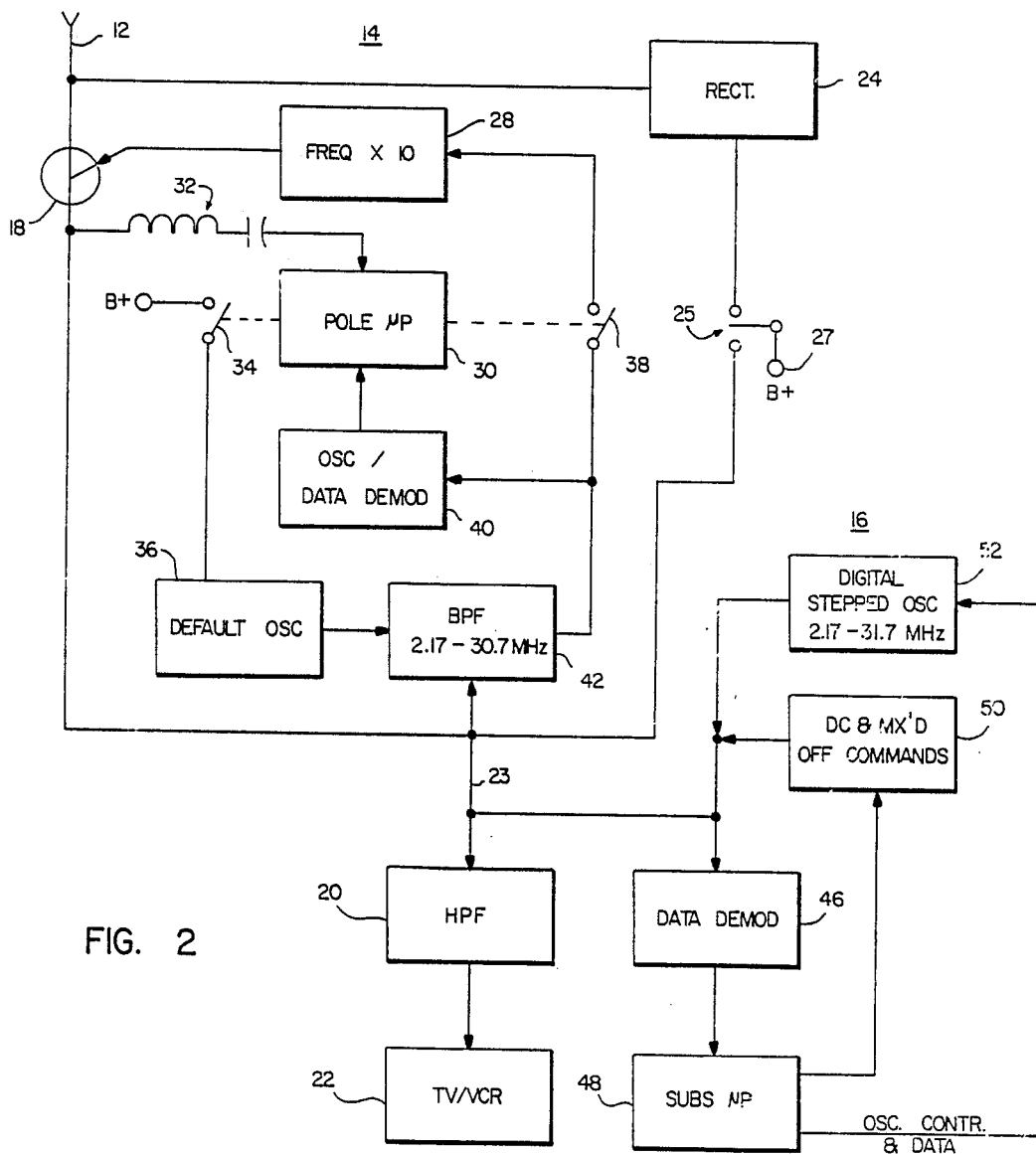
FIG. 2 is a block diagram of the pole and subscriber units of the invention.

Referring to FIGS. 1 and 2, a head end 10 is shown, which will be understood to include means for developing television signals and "authorization" and control data. The latter data may be sent in-band, that is, within the cable television channels, or out-of-band. Throughout the description, it should be appreciated that the degree of complexity with respect to communications between the cable head end and individual subscriber locations has no effect on the invention. Therefore, for clarity in describing the invention, a very simple communications system is used.

A cable 12 connects head end 10 to a plurality of subscriber locations generally designated 16, a single one of which is illustrated. Adjacent to the subscriber location, a pole unit, generally designated 14, is connected to the cable 12 by means of a directional coupler 18 which is coupled to a down link cable 23 connected to subscriber unit 16. Subscriber unit 16 includes a high pass filter 20, a data demodulator 46, a subscriber microprocessor 48, an OFF command unit 50 and a digital stepped oscillator 52. The output of high pass filter 20 is connected to the subscriber's VCR or TV. The subscriber unit microprocessor responds to authorization signals transmitted from the cable head end that are addressed to it for producing "off" commands to control the scrambling operations of pole unit 14. As will be apparent, the subscriber unit is only used in subscriber locations where premium service is authorized, since the function of the "off" commands is to enable reception of television signals normally rendered unviewable by pole unit scrambling.

Subscriber unit 16, when present, is located on the subscriber's premises where the temperatures are moderate and the environment controlled. Thus, the temperature sensitive and expensive components are located at the subscriber's premises, whereas the inexpensive and temperature insensitive components are included in pole unit 14. Since subscriber unit 16 is not required for subscribers who receive only the basic service, i.e., no premium programming, the installed equipment cost to the cable operator is minimized. The relatively expensive subscriber units are only required at subscriber locations where premium channels are being paid for. As will also be apparent, the power for operating the subscriber unit and the pole unit is supplied from the subscriber's premises. For basic only service, the power for the pole unit is supplied from the cable since there is no companion subscriber unit. A switch is provided in the pole unit for accepting power from the cable.

The power link for pole unit 14 includes a recitifier 24 which operates from the 60 volt AC present on cable 12 to develop B+ operating voltage for the pole unit at a terminal 27. Terminal 27 is connected to receive B+ from either the pole unit 14 or from the subscriber unit 16 by means of a switch 25. As mentioned, subscriber unit 16 includes data demodulator 46 connected to a subscriber microprocessor 48. One output of microprocessor 48 controls OFF command unit 50 for developing DC operating potentiala, coupled to the pole unit via switch 25, and for multiplexing "off" commands for the pole unit. Another output controls digital stepped oscillator 52. Both the digital stepped oscillator and the multiplexed "off" command signals are transmitted over down link cable 23 to the pole unit 14. It will be appreciated by those skilled in the art, that subscriber microprocessor 48 is conventional and receives and detects data in the form of authorization controls and commands supplied from the head end over cable 12 and down link cable 23. The received data is demodulated by demodulator 46. In accordance with the preferred embodiment of the invention, subscriber microprocessor 48 provides coded or encrypted "off" commands to pole unit 14 which instructs the pole unit to turn off the interfering signal for any premium channel that the subscriber is authorized to receive. The subscriber microprocessor 48 also provides control information to digital stepped oscialltor 52 as well as predetermined amplitude modulated data for enabling the pole unit to determine when something is amiss in the signal it receives via down link cable 23. This feature helps to combat "piracy," i.e., tapping into down link cable 23 and providing an oscillating signal.

As indicated on the drawing, the frequencies of digital stepped oscillator 52 range between 21.7 MHz and 30.7 MHz in 600 KHz steps. The output of stepped oscillator 52 is passed by a bandpass filter 42 (in pole unit 14) coupled to down link cable 23 and supplied to an oscillator and data demodulator 40. Filter 42 also feeds a frequency multiplier 28 through a normally closed switch arrangement 38. This circuit, which is under control of a pole microprocessor 30, is responsible for injecting interfering carriers of 217 MHz-307 MHz (corresponding to cable channels 23-38) into directional coupler 18 and along down link cable 23 to the subscriber unit. Thus the output of digital stepped oscillator 52 is multiplied in frequency ten times by frequency multiplier 28 to develop the interfering carriers that are supplied to the subscriber unit along with the television channels. Thus, both the regular television channels ad the interfering signals pass through high pass filter 20 and are supplied to the subscriber's TV/VCR 22. The output of stepped oscillator 52 steps through the frequencies rapidly enough to make the corresponding channels totally unviewable. It should be apparent that fractional frequencies other than 1/10 may also be used with a corresponding change in the multiplication factor of frequency multiplier 28.

The use of 1/10 frequency interference signals that are generated in the subscriber unit and sent to the pole unit has two advantages. The lower frequencies are feasible since the oscillator is located in the subscriber's home where the temperatures are moderate and the environment is controlled Also, it prevents a pirate from simply splitting down link cable 23 with a directional coupler to access the signals from the pole. Any attempt to block the oscillator will result in the pole unit recognizig the loss of data that is included with the stepped oscillator output signals. When the data is not correct, or is missing, the pole unit puts out broad band interference and literally "wipes out" any signals on channels 23-38. Also, the data that is required widens the bandwidth of the interfering signal. Therefore, a pirate trap on the line must have a broad band and will eradicate too much of the TV signal to be useful.

Bandpass filter 42 is not critical and its response characteristic may be a little wide to account for temperature variations. For example, since TV channel 2 does not start until 54 MHz, a significant margin can be built into the filter. Even if some leakage of channel 2 occurs, it will be translated by pole unit 14 up to 540 MHz which is much too high to create any difficulties.

Oscillator data demodulator 40 may comprise a simple diode detector for delivering a continuous stream of data to pole microprocessor 30 even though the digital stepped oscillator is scanning. The "off" commands from the subscriber unit are passed by a tuned network 32 to pole microprocessor 30 where they are recognized and pole microprocessor 30 responds by opening switch 38 to remove the 1/10 frequency signal from bandpass filter 42 that corresponds to the frequency of the premium channel the subscriber is authorized to receive. That 1/10 frequency is not passed to frequency multiplier 28, and consequently, no interfering frequency is produced for that premium channel signal, which is received by the subscriber by means of high pass filter 20.

Under normal conditions, subscriber unit 16 supplies DC power along down link cable 23 to the pole unit. Pole microprocessor 30 is programmed, in the absence of the data provided on the output of digital stepped oscillator 52, to close a switch 34 to activate a default oscillator 36. Oscillator 36 generates a broad band interfering signal for application to bandpass filter 42 that overrides any signal that may be received via the off command data line. Thus, in the event of tampering and loss of the data, pole microprocessor 30 activates default oscillator 36, which develops a wide band interfering frequency for "wiping out" signals in the entire band of frequencies from 217 MHz to 307 MHz. Similarly, in the absence of subscriber unit 16, for example, where no premium channels are being paid for, default oscillator 36 operates continuously to scramble TV signals on channels 23-38. Here again, default oscillator 34 need to be constructed of critical components since its output is supplied through the bandpass filter where any harmful harmonics are eliminated. It is the presence of the default oscillator which permits the cable opertor to eliminate the in-home unit for basic service subscribers.

The microprocessor on the pole is quite simple since it only needs to read data, operate the two switches 34 and 36, decrypt the off commands from the subscriber unit and verify the contents of the data added to the output of the stepped oscillator in the subscriber unit. The pole unit can be made small enough to be inserted in the cable line as a standard trap. While not required, it may be temperature compensated with the use of a small thermistor controlled heating element for very little added cost.

It is seen that all of the scrambling is handled by the subscriber/pole unit combination and that consequently the head end equipment cost is minimal. The arrangement permits a very, very low head end cost for small systems and eliminates the incompatibility problem between set-top converter/decoders and VCR's and full function television receivers.

It is recognized that numerous modifications and changes in the described embodiment of the invention will be apparent to those skilled in the art without departing from its true spirit and scope. The invention is to be limited only as defined in the claims.

What is claimed is:

1. A cable communication system comprising:
   a head end source of television channel signals and subscriber authorization signals;
   cable means connecting said head end source to a plurality of subscriber locations and conveying all of said television channel signals and authorization signals thereto, each of said plurality of subscriber locations including tuner means for permitting selective reception of all said television channel signals;
   a scrambling station located near each subscriber location, including broadband interference generating means, for rendering at least some of said television channels unviewable at its associated subscriber location;
   means, at an authorized subscriber location, for generating specific interfering signals for overriding said broadband interference means; and
   control means at said authorized subscriber location for autmatically supplying said specific interfering signals to its associated one of said scrambling stations responsive to an authorization signal from said head end to permit viewing of an authorized one of said unviewable television channels.

2. A cable communication system comprising:
   a head end source of television channel signals and subscriber authorization signals;
   cable means connecting said head end source to a plurality of subscriber locations and conveying said television channel signals and authorization signals thereto;
   a scrambling station, located near each subscriber location, including frequency multiplier means for developing interfering signals corresponding to said unviewable television channels from divided down frequency signals for rendering at least some of said television channels unviewable at its associated subscriber location;
   control means at an authorized subscriber location for automatically controlling its associated one of said scrambling stations responsive to an authorizaton signal from said head end to permit viewing of an authorized one of said unviewable television channels; and
   said control means comprising precision oscillator means for developing said divided down frequency signals corresponding to the frequencies of said unviewable television channels.

3. The system of claim 2 wherein said control means includes microprocessor means under control of said authorization signals for developing off commands and wherein said scrambling station includes microprocessor means that responds to said off commands for preventing an output from said frequency multiplying means for authorized television channels.

4. The system of claim 3 wherein said scrambling station includes a default oscillator activated by said microprocessor means in said scrambling station in the absence of said divided down frequency signals from said subscriber location.

5. The system of claim 4 wherein said subscriber location also provides DC operating power to said scrambling station over said cable and further including means for developing DC operating potential for said scrambling station from power on said cable when said subscriber location control means is not present.

6. A method of operating a CATV scrambling system comprising a head end, a plurality of scrambling locations and a corresponding plurality of subscriber locations, all interconnected by a cable network comprising the steps of:
   generating a plurality of television signals and authorization signals at said head end;
   transmitting said television signals and authorization signals over said cable network to said subscriber locations;
   providing broadband interfering signals at said scrambling locations for a selected group of said television signals for preventing viewing thereof at said subscriber locations;
   supplying selected subscriber locations with control means for producing specific interfering signal frequencies under control of said head end authorization signals; and
   supplying said interfering signal frequencies to the associated scrambling location for overriding said broadband interfering signals and permitting reception at said subscriber locations of said selected television signals as authorized by said authorization signals.

7. A method of operating a CATV scrambling system as set forth in claim 6 comprising the further steps of generating, under control of said control means, a fractional frequency corresponding to each of said selected television signals;
   providing the selected fractional frequencies to the associated scrambling location;
   multiplying said fractional frequencies at said scrambling location; and
   inserting said multiplied fractional frequencies in interfering relationship with said selected television signals transmitted to said subscriber locations.

* * * * *